United States Patent Office 3,505,216
Patented Apr. 7, 1970

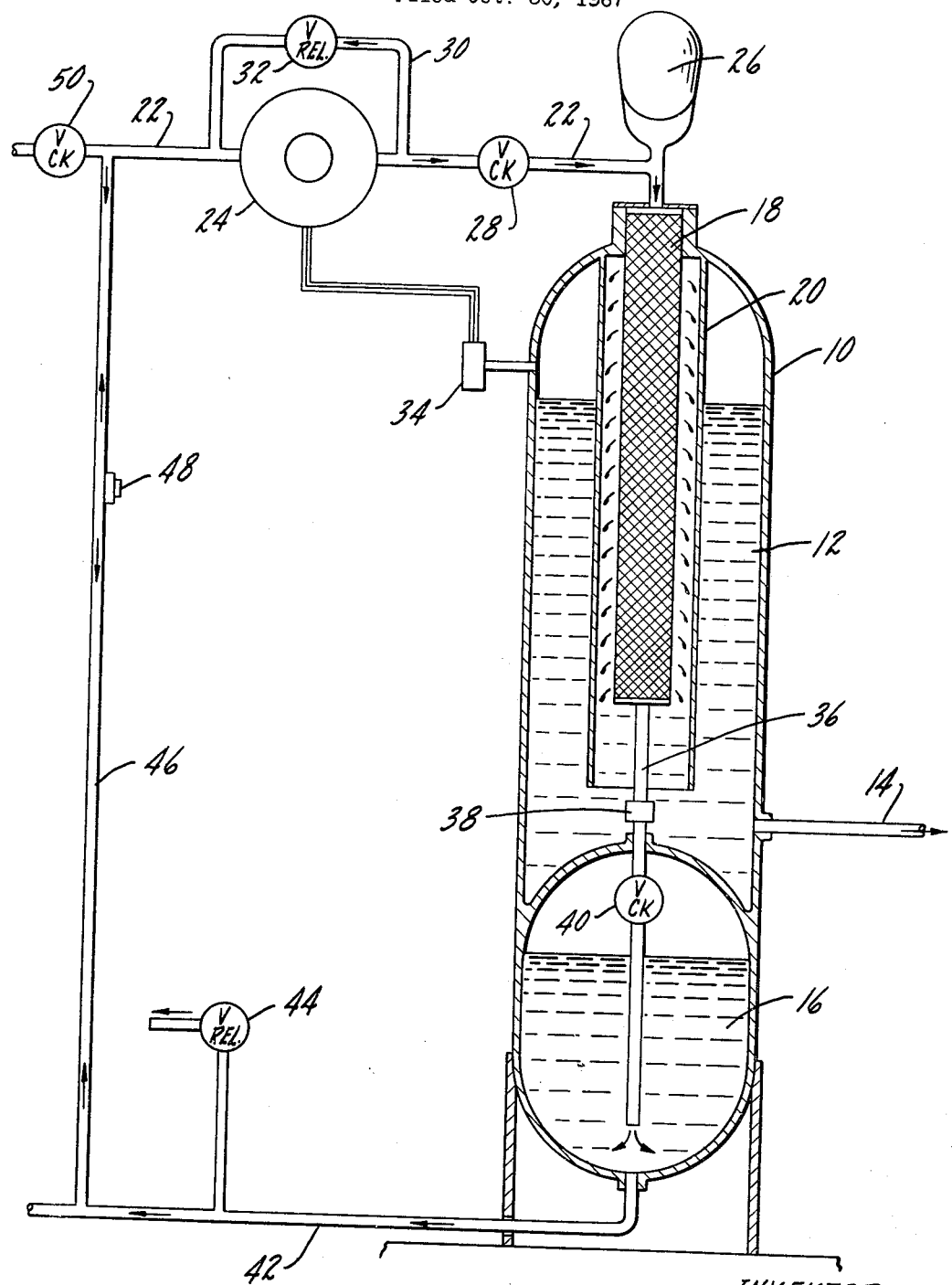

3,505,216
REVERSE OSMOSIS WATER SOFTENING METHOD AND APPARATUS
Benjamin H. Kryzer, St. Paul, Minn., assignor, by mesne assignments, to Union Tank Car Company, a corporation of Delaware
Filed Oct. 30, 1967, Ser. No. 678,978
Int. Cl. B01d 31/00, 13/00
U.S. Cl. 210—23              5 Claims

ABSTRACT OF THE DISCLOSURE

An economical method and apparatus are provided for producing soft water by reverse osmosis. In the method, water under pressure is conducted into an inlet zone and a portion is passed through a semi-permeable membrane into a soft water zone. The remainder is conducted into a hard water zone, where at least a portion of it is stored. This hard water is utilized, by conducting it to a suitable water distribution system, by reintroducing it into the inlet zone, or both. The apparatus includes a liquid container having hard and soft water zones separated by a semi-permeable membrane, together with hard and soft water outlet means, hard water storage means, and pressure relief means for removing excess hard water from the hard water storage means.

---

The present invention relates to improvements in the art of water softening, and more specifically to an improved method and apparatus for softening water by reverse osmosis.

Semi-permeable membranes have long been known. As understood by those skilled in the art, the term covers any of a large number of materials, usually deposited on a porous support member, that all have the ability to pass certain molecules, while retarding the passage of others. Thus, a membrane may allow the passage of molecules of a solvent while obstructing the passage of molecules of a dissolved solute. This separation may be accomplished by taking advantage of the difference in size between the solute and solvent molecules, permitting the passage of the smaller solvent molecules while retarding the passage of the larger solute molecules. Other membranes take advantage of the charge of the solute molecules, permitting the passage of uncharged solvent molecules, but retarding the passage of charged solute molecules. The latter types of membranes are especially suitable for the osmosis of solvents containing ionized materials.

When a solvent containing dissolved material is placed on one side of a semi-permeable membrane, and the same solvent with a lesser concentration of the dissolved material is placed on the other side, a so-called "osmotic pressure" will be produced on the side having the highest solute concentration. This results from the solvent migrating through the membrane toward the higher concentration in an attempt to form a concentration equilibrium. However, since the solute molecules cannot migrate through the membrane, the more concentrated solution will be diluted until an equilibrium is reached. The pressure on the side containing the higher solute concentration is known as the osmotic pressure.

Reverse osmosis takes advantage of this principle for the purification of liquids. Considering, for example, a simple saline solution separated from fresh water by a semi-permeable membrane, an osmotic pressure will normally be formed on the saline side. By applying a pressure to the saline side, which is greater than the osmotic pressure, the normal equilibrium is upset, and water migrates from the saline side to the fresh water side. This produces a more concentrated saline solution on one side, while in effect "squeezing out" fresh water on to the other side of the membrane.

The softening of water requires the removal of ions that form precipitates with soap, primarily $Ca^{++}$ and $Mg^{++}$. In conventional home water softening systems, this is accomplished with ion exchange resins that exchange these ions for sodium ions, which do not form precipitates. However, such systems have the disadvantage of introducing sodium ions into the water, which affects the taste. The presence of sodium ions also renders the water unusable in many evaporation-type appliances, such as steam irons, where a sodium salt residue is formed. Finally, ion exchange systems require periodic regeneration to refresh the supply of sodium ions in the resin. Regeneration normally requires that the system be shut down, so that no water is softened while this operation is taking place.

While reverse osmosis does away with such problems, systems incorporating this principle have not heretofore been considered practical for home use primarily because they are uneconomical. That is, the raw water that is passed along along one side of the semi-permeable membrane is enriched in impurities (hardened) and then passed out through the drain. Even under relatively high pressures, a great deal of water is wasted in order to obtain sufficient soft water to satisfy household demands.

Accordingly, it is the object of the present invention to provide an improved, economical method and apparatus for supplying soft water for a household system by reverse osmosis.

Generally, the present invention achieves improved economy in the purification of water in a reverse osmosis system by providing means for storing and utilizing at least a portion of the hard water, which is enriched in impurities, and which has passed the hard water (high pressure) side of a semi-permeable membrane. In carrying out the method, raw water containing impurities is conducted into a water inlet zone at a pressure greater than the osmotic pressure. This causes a portion of the water to pass through a semi-permeable membrane into a soft water zone, removing the hardness-producing ions, which cannot pass. The water that did not pass through the membrane, and is now enriched in impurities, is conducted into a hard water storage zone, where at least a portion of it is stored before being utilized.

In the preferred embodiment, the hard water is utilized by delivering it to a separate water distribution system that does not require soft water, while the water that has passed through the membrane is delivered to devices that have soft water requirements. The hard water may also be utilized for recirculating and reintroducing at least a portion of its into the inlet water. While this latter step alone will result in improved economy, it is most advantageous when used together with the step of delivering at least a portion of the hard water to a water distribution system that does not require soft water.

The present invention also includes apparatus for carrying out the aforementioned method, basically comprising a container having a semi-permeable membrane dividing it into a soft water zone and a hard water zone. The container has inlet means for introducing raw water under pressure into the hard water zone. The pressure, which is greater than the osmotic pressure for the membrane-water combination, causes a portion of the water to be purified by reverse osmosis, passing to the soft water zone. Soft water outlet means are provided for removing soft water from the soft water zone, and hard water outlet means are provided for removing the hard water. The apparatus also includes hard water storage means for storing at least a portion of the hard water, which is enriched in impurities after passing through the hard water zone.

The invention, both as to its organization and method of operation, taken with the advantages thereof, will be best understood by reference to the following detailed description taken in conjunction with the drawing, which is a partially cross-sectional view of a reverse osmosis apparatus embodying the features of the present invention.

In carrying out the present invention, water under pressure is delivered to the "hard water side" of a semi-permeable membrane. The pressure required to produce reverse osmosis depends upon both the concentration of impurities within the water and the precise nature of the semi-permeable membrane. Generally, pressures in the range of about 40–600 p.s.i.g. may be employed. Normal line pressures run from about 40–90 p.s.i.g., the achievement of higher pressures requiring a pump. Although there is no theoretical upper limit on the pressure, above about 600 p.s.i.g. there is a danger of rupturing the semi-permeable membrane. The higher pressures produce the better yields of purified water, and are therefore most desirable. The preferred pressure is from about 150 to about 250 p.s.i.g., which can be produced with conventional pressure boosting pumps and is practical in a home water system.

The water that does not pass through the semi-permeable membrane, referred to herein as "hard water," is stored for use. This hard water may be delivered to a separate water distribution system that does not require soft water, such as one supplying toilets, sprinkling systems, etc. Alternatively, at least a portion of the stored hard water may be mixed with the incoming water in the inlet zone, recirculating it to economize operation. In the preferred embodiment, both functions are performed. That is, hard water is delivered to the inlet zone, to a water distribution system, or to both, depending on requirements. The soft water is, of course, delivered to portions of the water system that require purified water such as laundry, sinks, dishwashers, etc.

Since the demands for soft and hard water will not always be the same as the output of the system, a portion of the hard water is drained off if the demand is insufficient. In the event that the demand for hard water exceeds that for soft water, a portion of the raw, untreated water may be delivered to the distribution system utilizing hard water.

The drawing shows apparatus embodying the features of the present invention. The apparatus includes a tank 10 having an upper, soft water storage compartment 12, having a soft water outlet line 14, and a lower, hard water storage compartment 16. The soft water storage compartment 12 has a central, cylindrical, semi-permeable membrane 18 surrounded by a coaxial, cylindrical baffle 20.

A raw water inlet line 22 communicates with an upper portion of the semi-permeable membrane 18. Although not usually essential to the operation of the invention, for improved efficiency the inlet line 22 preferably includes a booster pump 24 for increasing the water pressure and pressure-equalizing air chamber 26 to maintain a relatively even pressure in the inlet line 22, preventing the shock of any sudden pressure changes from being transmitted to the membrane 18. A check valve 28 is provided between the pump 24 and the membrane 18 to prevent water from flowing in a reverse direction when the pump 24 is shut off. The booster pump 24 has a pressure release line 30 having a pressure release valve 32 located thereon. The pressure release valve 32 serves as a safety valve to prevent the buildup of excess pressure within the tank 10. The pump 24 is controlled by a switch 34, which shuts off the motor when a preselected pressure level is reached within the soft water compartment 12. This pressure should be selected to maintain the soft water compartment 12 nearly full.

The inside of the semi-permeable membrane 18 defines a hard water zone wherein the raw water will be enriched in impurities. At the bottom end, the membrane 18 has communicating therewith a hard water outlet pipe 36 leading to the hard water storage compartment 16. This pipe 36 has a flow restrictor 38 to maintain pressure within the membrane 18 and a check valve 40 to prevent flow from the hard water compartment 16 back toward the membrane 18. A hard water delivery line 42 communicates with the bottom of the hard water storage compartment 16, and leads to a portion of the water distribution system (not shown) that can readily utilize hard water. A pressure release valve 44 is provided on the hard water delivery line 42, communicating with the drain or sewer (not shown). This valve 44 prevents the buildup of excessive pressure inside the hard water compartment 16, which may result from a relatively low demand for the hard water.

In the preferred embodiment of the present invention, a recirculating line 46 is provided communicating between the hard water delivery line 42 and the inlet line 22. When a booster pump 24 is employed, it must be located between the communication point of the recirculating line 46 and the membrane 18 in order that the recirculating line 46 will not be subjected to the high pressures delivered by the booster pump 24. The recirculating line 46 includes a uni-directional flow restrictor 48 that permits free flow from the inlet line 22 to the hard water delivery line 42 (a downward direction in the embodiment shown), but permits only restricted flow in the opposite direction. The recirculating line 46 thus supplies raw water from the inlet line 22 to the hard water delivery line 42 when the demand for hard water exceeds the supply. On the other hand, when the demand for hard water is low compared to that for the soft water, a portion of the hard water will be delivered through the recirculating line 46 into the inlet line 22. The flow restrictor 48 is necessary in order to prevent all of the low-quality water from being recycled since this would merely result in continuous recirculation of the hard water. When the recirculating line 46 is incorporated into the apparatus, it is also necessary to provide a check valve 50 along the inlet line 22. The recirculating line 46 communicates with the inlet line 22 at a point between the check valve 50 and the booster pump 24. The check valve 50 is designed to inhibit reverse flow in the inlet line 22, which could sometimes be produced by the pressures in the recirculating line 46.

The flow of water during the operation of the apparatus is indicated by the arrows. Raw water enters through the inlet line 22, travels through the check valve 50, is increased in pressure by the pump 24, passes through the check valve 28, and enters the interior of the cylindrical membrane 18. The air chamber 26 aids in keeping the pressure relatively even, smoothing out large fluctuations. Since the input pressure is greater than the osmotic pressure, and generally in the range of about 150–250 p.s.i.g., a portion of the water passes through the membrane 18, past the baffle 20, and into the soft water compartment 12. This purified water is delivered to appliances requiring softened water through the soft water outlet line 14. The water that does not pass through the membrane 18 is enriched in impurities and passes through the hard water outlet pipe 36, through the flow restrictor 38, and check valve 40, and into the hard water compartment 16. Water from the hard water compartment 16 is delivered to devices that can utilize it through a distribution system connected to the water delivery line 42. If the demand for hard water is greater than can be supplied by the apparatus, raw water from the inlet line 22 passes through the recirculating line 46 and is mixed up with the hard water in the hard water delivery line 42. On the other hand, if the supply of hard water exceeds the demand, at least a portion of the hard water passes through the recirculating line 46 to the inlet line 22 where it is mixed with the incoming raw water. If the recirculation is still insufficient to use up the supply of hard water, the excess will be drained through the release valve 44, set at a pressure below that which could damage the apparatus or permit the system to back up.

A wide variety of semi-permeable membranes may be utilized in the present invention, the selection depending upon such factors as cost, pressure to be utilized, solutes to be removed, etc., as is well known in the art. Suitable membrane materials for use in the present invention include both those of the "ion exclusion type" and the "water solvating type" as well as the "molecular size type."

Ion exclusion materials are those that have an ionic charge preventing the passage of molecules of the same charge. Examples include clays, resins, etc., having high fixed ion concentration. Specific examples include clays such as montmorillonites, kaolinites, halloysites, vermiculites, illites, and chlorites, and resins such as carbohydrates, gums, sulfonated polystyrenes, chloromethylated polystyrenes, etc. These ion exclusion materials may optionally be treated with additional chemicals to increase the surface charge concentration.

Materials of the water solvating type are those that depend on the ability of water to solvate active sites. Salt ions are rejected because the water has little solution capacity. These membranes are generally large molecular weight materials such as cellulose acetate, cellulose propionate, cellulose acetate propionate, cellulose acetate butyrate, polyvinyl alcohol, polyvinyl acetate, polystyrene, polycarbonate, etc. Such materials are often treated with a "swelling agent" to catalyze swelling. Suitable swelling agents include salts containing magnesium, zinc, or beryllium cations, chlorate or halide anions, or combinations of these. Many more complex compounds are also suitable, as is well known in the art.

Molecular size-type materials are those that inhibit the passage of large molecules while permitting the passage of small ones. They are useful where the solute molecules are substantially larger than the solvent molecules.

Often, a suitable semi-permeable membrane material will be formed of a combination of different materials in order to obtain a particular set of properties. For strength, the material is usually coated upon an inert, porous base such as fiberglass, porous porcelain, etc. As used herein, the term "semi-permeable membrane" refers to any of the above-mentioned types, or to combinations thereof, as will be understood by those skilled in the art.

I claim:

1. Apparatus for softening water comprising: a liquid container; a semi-permeable membrane dividing said container into a soft water zone and a hard water zone; inlet means for introducing hard water under pressure into said hard water zone; soft water outlet means for removing soft water from said soft water zone; hard water outlet means for removing hard water from said hard water zone; hard water storage means for storing at least a portion of the hard water removed from said hard water zone; pressure release means for removing excess hard water from said hard water storage means; recirculating means for delivering water between said hard water storage zone and said inlet means, said recirculating means including regulating means permitting relatively free flow from said inlet means to said hard water storage means, and said regulating means restricting the flow from said hard water storage zone to said inlet means; and pressure increasing means for increasing the pressure in said inlet means, said pressure increasing means being located on said inlet means between said recirculating means and said container.

2. The apparatus of claim 1 further including hard water delivery means for delivering hard water from said hard water storage means to a water distribution system.

3. The apparatus of claim 1 further including pressure equalizing means for absorbing fluctuations in pressure in said inlet means.

4. A method for the softening and distribution of hard water comprising:
   (a) increasing the pressure of the hard water to a level above normal line pressure;
   (b) conducting said hard water under said increased pressure into a hard water inlet zone;
   (c) passing a portion of said hard water through a semi-permeable membrane so as to be softened, and storing same in a soft water storage zone;
   (d) conducting the remaining portion of said hard water into a concentrated hard water storage zone;
   (e) delivering at least a portion of the water from said concentrated hard water storage zone to a water distribution system; and
      (1) increasing the pressure of at least a portion of the water from said concentrated hard water storage zone and delivering same to said hard water inlet zone during periods of high demand for soft water relative to the demand for water by said distribution system;
      (2) or delivering said hard water directly to said water distribution system during periods of high demand for water by said water distribution system relative to the demand for soft water.

5. The method as defined in claim 4 wherein said pressure is increased to about 150 to 250 p.s.i.g.

References Cited

UNITED STATES PATENTS

| | | | |
|---|---|---|---|
| 1,825,631 | 9/1931 | Horvath | 210—23 |
| 3,133,132 | 5/1964 | Loeb et al. | 210—23 X |
| 3,365,061 | 1/1968 | Bray | 210—321 X |
| 3,390,773 | 7/1968 | Merten | 210—321 X |
| 3,397,785 | 8/1968 | Jarvis et al. | 210—321 X |
| 3,398,088 | 8/1968 | Okey | 210—23 X |

OTHER REFERENCES

"Reverse Osmosis," distributed at the First International Symposium On Water Pesalination, held Oct. 3–9, 1965, Washington, D.C., 2 pp.

"1964 Saline Water Conversion Report," placed on sale July 14, 1965, a publication of The Office of Saline Water, U.S. Dept. of Interior, for sale by the Superintendent of Documents, U.S. Gov't. Printing Office, 279 pp., pp. 174–177 relied on.

Bray et al.: Design Study of a Reverse Osmosis Plant For Sea Water Conversion, Office of Saline Water R. & D. Progress Report No. 176, 2 parts pp. 13–27 of part 2 relied on, received in Patent Office June 6, 1966.

REUBEN FRIEDMAN, Primary Examiner

FRANK A. SPEAR, JR., Assistant Examiner

U.S. Cl. X.R.

210—134, 137, 257, 321, 349